United States Patent [19]

Tyler

[11] Patent Number: 5,306,076
[45] Date of Patent: Apr. 26, 1994

[54] PROPORTIONAL CONTROL VALVE WITH PRESSURE COMPENSATION

[75] Inventor: Jeffrey A. Tyler, Newark, N.Y.

[73] Assignee: G. W. Lisk Company, Inc., Clifton Springs, N.Y.

[21] Appl. No.: 886,123

[22] Filed: May 20, 1992

[51] Int. Cl.[5] .................................................. B60T 8/00
[52] U.S. Cl. .............................. 303/118.1; 137/627.5; 137/625.65; 137/596.17
[58] Field of Search .............. 303/119.2, 118.1, 117.1, 303/84.1, 3, 15, 9.66, 9.72, 9.75; 137/627.5, 625.65, 596.17

[56] References Cited

U.S. PATENT DOCUMENTS

| | | | |
|---|---|---|---|
| 2,194,762 | 3/1940 | Maliphant | 303/21 |
| 2,527,883 | 10/1950 | Ingres et al. | 188/3 |
| 2,919,162 | 12/1959 | Roberts | 303/21 |
| 3,401,984 | 9/1968 | Williams et al. | |
| 3,525,555 | 8/1970 | Meyer et al. | 303/40 |
| 3,768,519 | 10/1973 | Morse | 303/21 F |
| 3,857,615 | 12/1974 | Acar | 303/212 F |
| 3,907,379 | 9/1975 | Lawson | 303/21 F |
| 3,924,902 | 12/1975 | Engle | 303/15 X |
| 3,941,428 | 3/1976 | Rothwell et al. | 303/21 F |
| 4,077,674 | 3/1978 | Doto | 137/627.5 X |
| 4,145,091 | 3/1979 | Bueler et al. | 303/118 |
| 4,539,542 | 9/1985 | Clark | 335/261 |
| 4,557,527 | 12/1985 | Stumpe | 303/15 |
| 4,604,600 | 8/1986 | Clark | 335/261 |
| 4,605,197 | 8/1986 | Casey et al. | 137/625.64 X |
| 4,619,289 | 10/1986 | Tsuru et al. | 137/627.5 |
| 4,640,558 | 2/1987 | Nomura et al. | 303/119.2 |
| 4,662,605 | 5/1987 | Garcia | 137/625.69 X |
| 4,773,447 | 9/1988 | Imanaka et al. | 137/627.50 |
| 4,778,227 | 10/1988 | Bayliss | 303/119.2 |
| 4,821,770 | 4/1989 | Parrott et al. | 137/596.17 |
| 4,859,005 | 8/1989 | Rey et al. | 303/119.2 |
| 4,860,794 | 8/1989 | Parrott et al. | 137/596.17 |
| 5,000,421 | 3/1991 | Hendrixon et al. | 137/625.65 X |
| 5,015,046 | 5/1991 | Bissell | 303/118 |
| 5,051,631 | 9/1991 | Anderson | 137/625.65 X |
| 5,100,208 | 3/1992 | Angermaier | 303/36 |
| 5,127,435 | 7/1992 | Takata et al. | 137/625.65 X |
| 5,144,881 | 9/1992 | Cakmaz | 137/596.17 |

FOREIGN PATENT DOCUMENTS

| | | |
|---|---|---|
| 3240276 | 5/1984 | Fed. Rep. of Germany . |
| 3732445 | 4/1989 | Fed. Rep. of Germany . |
| 2576062 | 7/1986 | France . |
| 8810461 | 12/1988 | PCT Int'l Appl. . |
| 9207743 | 5/1992 | PCT Int'l Appl. . |

OTHER PUBLICATIONS

Advertisement Brochure entitled "MPP/MPZ Electro-Pneumatic Proportional Pressure Regulator Valve," published by Festo Corporation, 1988.

Primary Examiner—Matthew C. Graham
Assistant Examiner—Lee W. Young
Attorney, Agent, or Firm—Eugene Stephens & Associates

[57] ABSTRACT

A directional valve (170) includes an actuator (92, 144) responsive to feedback pressure from a closed volume load (182) for regulating fluid pressure of the load proportional to an electric signal (172). A double-acting cylinder (64, 148) has a plunger (58, 150) operatively associated with the actuator (92, 144) for opposing movement of the actuator proportional to the feedback pressure of the closed volume load. Opposite faces (66, 68 and 156, 158) of the plunger (58, 150) are arranged to balance the directional valve (170) against working pressure within the valve and to control the magnitude of the feedback force opposing movement of the actuator (92, 144).

31 Claims, 5 Drawing Sheets

PROPORTIONAL CONTROL VALVE WITH PRESSURE COMPENSATION

TECHNICAL FIELD

The invention relates to proportional control valves for controlling output pressure of a working port proportional to a control signal.

BACKGROUND

Proportional control valves can be actuated by proportional solenoids to regulate back pressure from remote devices. For example, my copending U.S. patent application Ser. No. 505,889, filed Apr. 6, 1990, now U.S. Pat. No. 5,123,718, discloses a solenoid actuated valve for controlling a flow of fluid under pressure to a brake cylinder. The flow of fluid is maintained until back pressure from the brake cylinder reaches a desired proportional relationship with an increased force exerted by the solenoid. Back pressure is reduced by exhausting fluid flowing from the brake cylinder until the back pressure returns to the desired proportional relationship with a decreased solenoid force.

However, fluid flows between the proportional valves and remote devices are accompanied by friction, which causes a pressure drop between the source and the destination of the fluid flow. Accordingly, pressure changes in remote devices such as brake cylinders or other closed volume loads tend to lag behind the changes in back pressure regulated by proportional control valves. This can cause instability in the operation of the valves.

While charging, for example, proportional control valves can momentarily close off the supply of pressurized fluid to the remote devices before the remote devices have reached the desired pressure level. Upon closing the supply, static pressure within the valves approaches the prior average dynamic pressure of the valves and remote devices, which is below the desired pressure level and can cause the valves to momentarily reopen. This sequence can be repeated many times until the desired pressure increase in the remote devices is reached.

Similar instability problems can be caused by a pressure difference between the proportional control valves and the remote devices while discharging. The valves can momentarily close off the exhaust of pressurized fluid from the remote devices before the pressure in the remote devices has reduced to a desired level. A static pressure increase in the valves up to the prior average dynamic pressure of the valves and the remote devices can cause the valves to momentarily reopen to continue to exhaust more of the pressurized fluid from the remote devices. Although the desired pressure level is eventually reached while either charging or discharging, the additional openings and closings of the valves, which are required to reach the desired pressure level, can cause accelerated wear, noise, pressure fluctuations, and a decreased response time.

In addition to instability problems caused by restrictions to fluid flow between proportional control valves and remote devices, these valves can also have design problems relating to limiting proportional solenoids to a reasonable size and power rating while sizing the valves to accommodate high rates of fluid flow that are required to achieve fast response times. For example, exhaust passages accommodating high rates of fluid flow are associated with large valve seats over which the back pressure from remote devices is applied. The solenoids are sized to overcome the forces generated by the back pressure applied over the area of the seats to regulate the back pressure proportional to a control force.

My copending application Ser. No. 505,889 reduces solenoid size requirements by providing two separate exhaust passages. One of the passages is sized to accommodate low rates of fluid flow, and the other passage is sized to accommodate high rates of fluid flow. The low-flow passage conveys back pressure to the solenoid, whereas the high-flow passage is opened in response to a pressure increase in the low-flow exhaust. This reduces the size and power requirements of the solenoid but makes the valve more complicated.

SUMMARY OF INVENTION

My invention improves stability of proportional control valves and permits the valves to be sized independently of power requirements for operating the valves. For example, a supplemental device such as a double-acting cylinder can be used in conjunction with the valve to balance the valve against internal working pressures and to reduce the magnitude of a feedback force opposing motion of a proportional actuator. The feedback force can be generated independently of the internal working pressures to compensate for frictional losses accompanying delivery of fluid flow to a remote device.

One version of my invention, which compensates for pressure losses across a restriction in a line delivering fluid under pressure to a closed volume load, includes a three-way directional valve and two actuators. The directional valve controls fluid flow through two passages for alternately pressurizing and exhausting a working port. One of the actuators is preferably a proportional solenoid that is movable in a first direction by an electrical control signal and is movable in a second direction by fluid pressure from a first side of a restriction to fluid flow between the directional valve and the closed volume load. The other actuator is preferably a double-acting cylinder that is movable in the first direction by fluid pressure from the first side of the restriction and is movable in the second direction by fluid pressure from a second side of the restriction. The two actuators are operatively associated with each other and with the directional valve to regulate fluid pressure at the second side of the restriction proportional to the electrical control signal.

The double-acting cylinder includes a plunger having opposing faces that are exposed to respective pressures from opposite sides of the restriction. A first of the opposing faces is exposed to fluid pressure between the directional valve and the restriction and is sized for balancing the directional valve against fluid pressure from the first side of the restriction. A second of the opposing faces is exposed to fluid pressure between the restriction and the closed volume load and is sized to control a feedback force to the solenoid actuator proportional to the fluid-pressure between the restriction and the closed volume load.

Thus, the double-acting cylinder provides the dual function of balancing the directional valve and controlling the feedback force to the solenoid actuator. Any restriction between the directional valve and closed volume load can be bypassed so that the feedback force more accurately represents the actual pressure at the closed volume load. For example, a separate line can be used to transmit fluid pressure directly from the closed volume load to the plunger, or a third passage can be formed within the valve to transmit fluid pressure to the plunger for effectively bypassing an internal restriction.

DETAILED DESCRIPTION

Figure 1:
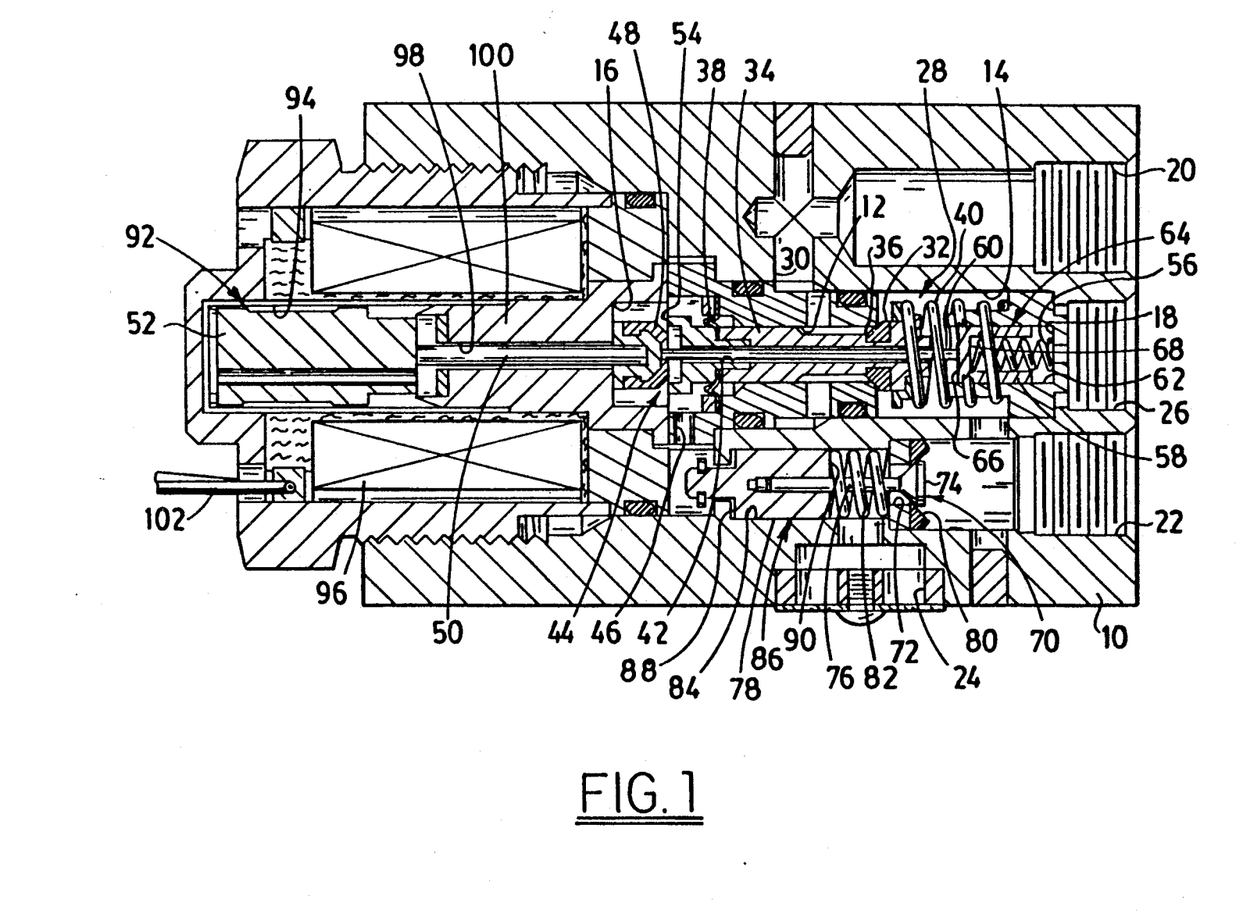
FIG. 1 is a cross-sectional view of a proportional control valve that is modified to compensate for an external restriction to air flow between the valve and a closed volume load.

One example of my invention for improving the stability of proportional control valves while discharging air flows from a closed volume load is illustrated by FIG. 1. The depicted valve is also constructed in accordance with my copending application Ser. No. 505,889, now U.S. Pat. No. 5,123,718, and this application is hereby incorporated by reference for all of its relevant disclosure.

The improved valve has a housing 10 enclosing a supply chamber 12, a delivery chamber 14, a relief chamber 16, and a control chamber 18. An inlet port 20 provides for connecting the supply chamber 12 to a source of pressurized air. A working port 22 provides for connecting the delivery chamber 14 to a closed volume load such as a brake cylinder or other remote device operated by air pressure. An exhaust port 24 Connects the relief chamber 16 to "atmosphere", i.e., the environment exterior of the housing 10; and a sensing port 26 provides for connecting the control chamber 18 to the closed volume load.

The supply chamber 12 and the delivery chamber 14 are interconnected by an intake valve 28 that controls air flow through a supply passage 30 extending between the inlet port 20 and the working port 22. The intake valve 28 includes a valve head 32 carried on a poppet assembly 34 and a valve seat 36 mounted in the housing 10. A diaphragm 38, which is also carried on the poppet assembly 34, is sized similar to the valve seat 36 for balancing the poppet assembly against air pressure in the supply chamber 12. However, a spring 40 biases the intake valve 28 into a closed position.

The delivery chamber 14 is connected to the relief chamber 16 by a return passage 42 through the poppet assembly 34 and a low-flow exhaust valve 44 that controls air flow through a primary exhaust passage 46 extending between the working port 22 and the exhaust port 24. The low-flow exhaust valve 44 includes a valve head 48 carried on a stem 50 of a solenoid armature 52 and a valve seat 54 carried on the poppet assembly 34.

The valve seat 54 of the low-flow exhaust valve is sized similar to both the valve seat 36 of the intake valve and the diaphragm 38 to further balance the poppet assembly 34 against respective air pressures in the delivery chamber 14 and the relief chamber 16. However, a spring 56 acting through a plunger 58 and a rod 60 biases the low-flow exhaust valve 44 into an open position.

The plunger 58 is guided within a bore 62 in the housing 10 forming a double-acting cylinder 64. An inner face 66 of the plunger 58 is exposed to air pressure in the delivery chamber 14, and an outer face 68 of the same plunger is exposed to air pressure in the control chamber 18. Any difference between air pressures in the delivery chamber 14 and the control chamber 18 is converted into a force transmitted by the plunger 58.

A high-flow exhaust valve 70 controls air flow through a secondary exhaust passage 72 that extends between the working port 22 and the exhaust port 24. The high-flow exhaust valve 70 includes a valve head 74 carried on a stem 76 of a plunger 78 and a valve seat 80 mounted in the housing 10. A spring 82 biases the high-flow exhaust valve into a closed position.

The plunger 78 is guided within a bore 84 in the housing 10 forming a single-acting cylinder 86. An inner face 88 of the plunger 78 is exposed to air pressure in the relief chamber 16, and an outer face 90 of the same plunger is exposed to atmospheric pressure through the exhaust port 24. Any positive pressure (i.e., positive gauge pressure) in the relief chamber is converted into a force transmitted by the plunger 78 in a direction for opening the high-flow exhaust valve 70. However, the plunger 78 is formed with clearance with respect to the bore 84 to permit a limited rate of air flow to escape from the relief chamber 16 to the exhaust port 24 without opening the high-flow exhaust valve.

A solenoid actuator 92 includes conventional features including a core 94 surrounded by a coil 96. The armature 52 is guided for movement along the core 94, and a bore 98 is also formed in a pole piece 100 for similarly guiding the stem 50. Wires 102 convey electric current to the coils as a control signal for regulating back pressure from the closed volume load proportional to the electric current.

The solenoid 92 exerts an attractive force between the armature 52 and the pole piece 100 urging movement of the stem 50 and the valve head 48 in a first direction. However, initial movement of the valve head 48 is opposed by a small biasing force exerted by the spring 56 through the plunger 58 and the rod 60. Once the biasing force of the spring 56 has been overcome by a predetermined threshold force exerted by the solenoid, the valve head 48 can be moved against the valve seat 54 for closing the low-flow exhaust valve 44.

Further movement of the valve head 48 together with the poppet assembly 34 is opposed by another small biasing force exerted by the spring 40. Accordingly, the solenoid must exert a second predetermined threshold force to move the valve head 32 off of the valve seat 36 for opening the intake valve 28 and charging the working port 22. Air pressure increases in the delivery chamber 14 until a feedback force applied to the valve head 48 is sufficient to overcome the solenoid force and close the intake valve.

A decrease in the solenoid force with respect to the feedback force applied to the valve head 48 moves the valve head 48 off of the valve seat 54 for opening the low-flow exhaust valve 44. Low rates of air flow are discharged along the primary exhaust passage 46 through the clearance space between plunger 78 and bore 84 of the single-acting cylinder 86 to the exhaust port 24. However, high rates of air flow accompanying large decreases in the solenoid force cause pressure to accumulate against the inner face 88 of the plunger 78. When sufficient pressure has accumulated to overcome the predetermined biasing force of spring 82, the valve head 84 is pushed off of the valve seat 80 for opening the high-flow exhaust valve 86.

The high rate of air flow is discharged through the secondary exhaust passage 72 to the exhaust port 24 until the pressure against the plunger 78 has decreased enough to allow the spring 82 to restore the high-flow exhaust valve 86 to its closed position. However, the low-flow exhaust valve 44 remains open until the feedback force applied against the valve head 48 is reduced to a magnitude matching the decreased solenoid force.

While charging or discharging the working port 22, air pressure in the delivery chamber 14 is a dynamic pressure that can lag behind desired pressure changes in the closed volume load. For example, rapid discharges of air flow through the high-flow dump valve can momentarily reduce air pressure in the delivery chamber below air pressure in the closed volume load. However, air pressure in the control chamber 18 is not subject to the same dynamic pressure fluctuations. In fact, the control chamber can be understood to form a part of the volume of the closed volume load itself and thereby reflects the pressure of the closed volume load independently of the flow of air through the working port 22.

Air pressure in the delivery chamber 14 is applied against both the valve head 48 of the low-flow exhaust valve and the inner face 66 of the plunger 58. The area over which the delivery chamber air pressure is applied to the inner face 66 is similar to the area over which the delivery chamber air pressure is applied to the valve head 48. Accordingly, the solenoid actuator 92 and the plunger 58 are urged by the delivery chamber air pressure in opposite directions with equal force. However, no separating forces are transmitted between the solenoid actuator 92 and the plunger 58 in this embodiment because the rod 60 carried by the plunger 58 abuts but is not connected to the valve head 48.

The area of outer face 68 of the plunger 58 over which air pressure from the control chamber 18 is applied is also similar to the areas of the inner face 66 and valve head 48 over which the delivery chamber air pressure is applied. Any increase in pressure of the delivery chamber 14 with respect to pressure in the control chamber 18 urges the plunger 58 in the same first direction of motion imparted by the solenoid actuator and moves the rod 60 away from the valve head 48. However, any decrease in the pressure of the delivery chamber 14 with respect to the pressure of the control chamber 18 urges the plunger 58 in a second opposite direction and moves the rod 60 against the valve seat with a force proportional to the difference between the two pressures. Accordingly, the total feedback force exerted on the valve head 48 by the pressure in the delivery chamber 14 and the differential pressure between the delivery chamber 14 and the control chamber 18 for opposing movement of the solenoid actuator 92 is equal to the larger of the pressures in the delivery chamber 14 and the control chamber 18.

While charging the working port 22, pressure in the delivery chamber 14 is generally not less than the pressure in the control chamber 18, and the double-acting cylinder 64 has no effect on the movement of the solenoid actuator 92, which is otherwise opposed by a first feedback force that is proportional to the pressure in the delivery chamber. However, while discharging the working port, pressure in the delivery chamber can drop considerably below the pressure in the control chamber, and the double-acting cylinder 64 applies a second feedback force proportional to this pressure difference against the valve head 48 so that the total feedback force opposing motion of the solenoid actuator 92 is proportional to the pressure in the control chamber 18. This prevents the low-flow exhaust valve 44 from prematurely closing in response to large discharges of air flow through the high-flow exhaust valve 70.

Figure 2:
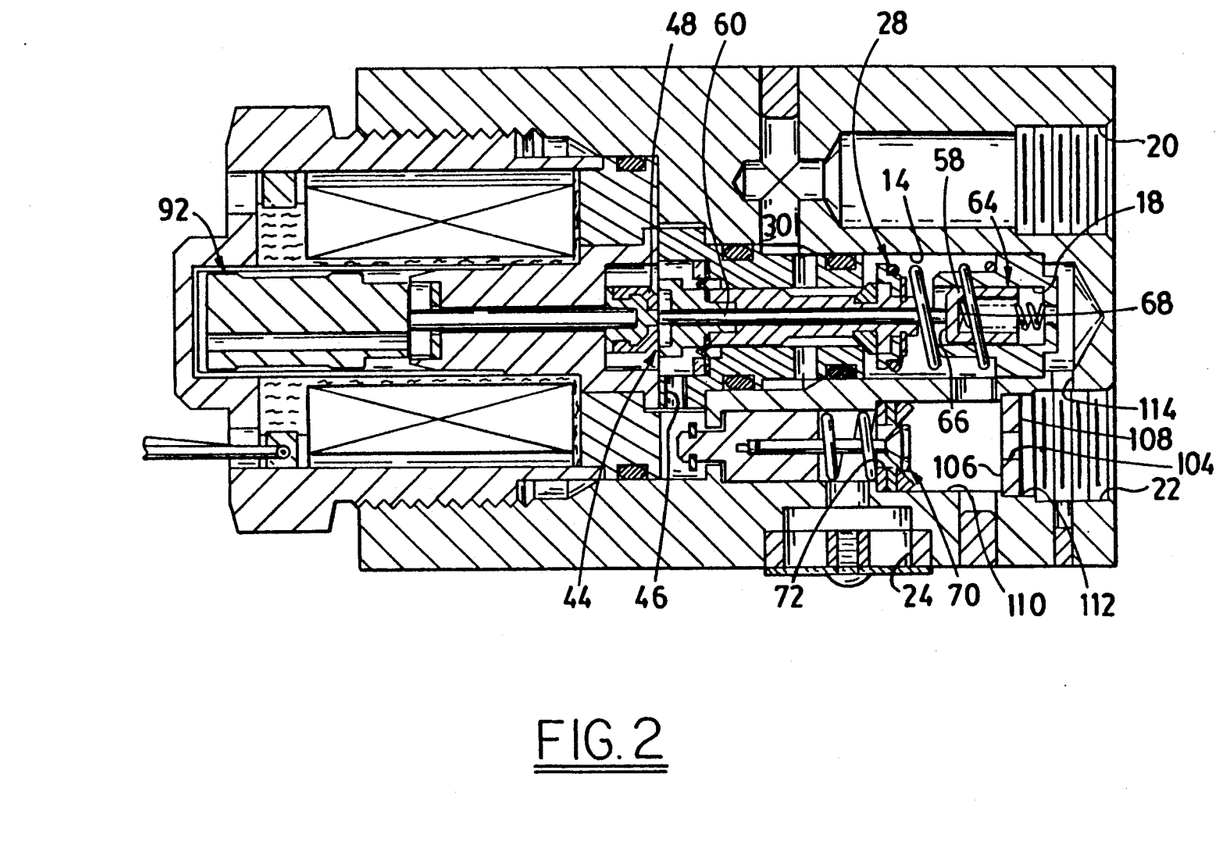
FIG. 2 is a cross-sectional view of a similar proportional control valve that is modified to compensate for an internal restriction to air flow.

FIG. 2 illustrates a similar proportional control valve that is modified to improve stability while both charging and discharging. The valve of FIG. 2 incorporates many of the same elements as the valve of FIG. 1, which are referenced by the same numerals, including the intake valve 28, the low-flow exhaust valve 44, and the high-flow exhaust valve 70. The intake valve 28 controls air flow through the supply passage 30 connecting the inlet port 20 to the working port 22. The low-flow exhaust valve 44 and the high-flow exhaust valve 70 control respective air flows through the primary exhaust passage 46 and the secondary exhaust passage 72 connecting the working port 22 to the exhaust port 24.

However, in place of the implied external restriction of FIG. 1 between the working port 22 and the closed volume load, the valve of FIG. 2 includes an internal restrictor 104 along a common portion of the supply passage 30 and the exhaust passages 46 and 72. The restrictor 104 is sized to cause a pressure drop across inner and outer sides 106 and 108 of the restrictor accompanying high rates of air flow through the restrictor. A first portion 110 of the common passage between the inner side 106 of the restrictor and the intake valve 28 can be regarded as forming a part of the volume of the delivery chamber 14. A second portion 112 of the common passage between the outer side 108 of the restrictor and the working port 22 can be regarded as forming a part of the volume of the closed volume load.

In place of a sensing port, feedback passage 114 connects the second portion 112 of the common passage to the control chamber 18 so that the control chamber is also included as a part of the volume of the closed volume load. Although the double-acting cylinder 64 has not changed, the rod 60 carried by the plunger 58 is connected to the valve head 48 of the low-flow exhaust valve for movement together with the valve head as a single body.

Since the valve head 48 and the inner face 66 of the plunger 58 are connected by the rod 60 and have the same size areas exposed to the air pressure in the delivery chamber, the valve head 48 and the plunger 58 are effectively balanced against motion imparted by the delivery chamber air pressure. However, outer face 68 of the plunger is exposed to air pressure in the control chamber. Accordingly, movement of the solenoid actuator 92 is opposed by a feedback force proportional to the control chamber air pressure, which more closely matches the actual air pressure of the closed volume load than the delivery chamber air pressure.

Figure 3:
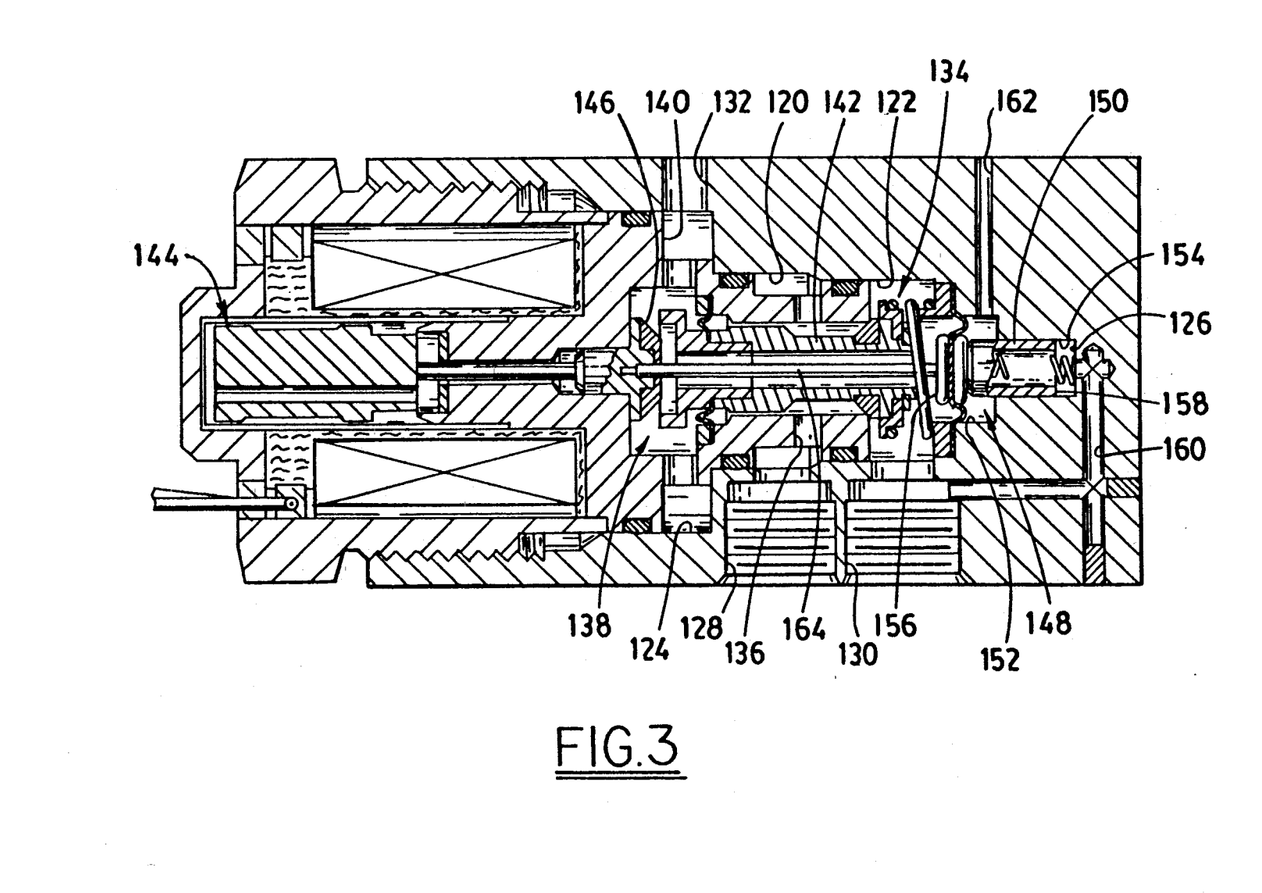
FIG. 3 is a cross-sectional view of an alternative proportional control valve that is modified to reduce the magnitude of a feedback force opposing motion of a proportional actuator.

FIG. 3 is an alternative proportional control valve that is made with larger internal passages to discharge high rates of air flow through a single exhaust valve.

However, the proportional valve also includes several features in common with the preceding embodiments including a supply chamber 120, a delivery chamber 122, a relief chamber 124, and a control chamber 126. An inlet port 128 connects the supply chamber 120 to a source of pressurized air, a working port 130 connects the delivery chamber 122 to a closed volume load, and an exhaust port 132 connects the relief chamber 124 to "atmosphere" surrounding the valve.

An intake valve 134 controls air flow through a supply passage 136 connecting inlet port 128 to working port 130. An exhaust valve 138 controls air flowing through an exhaust passage 140 connecting the working port 130 to the exhaust port 132. The intake valve 134 and the exhaust valve 138 are much larger than the corresponding valves of the preceding embodiments but are sized similar to each other for balancing a poppet assembly 142 against pressures in the surrounding chambers. A solenoid actuator 144 is connected to a valve head 146 of the exhaust valve 138 and transmits a force proportional to an electrical current against the poppet assembly 142 for closing the exhaust valve 138 and opening the intake valve 134.

A double-acting cylinder 148 includes a plunger 150 having two different diameter sections that are received in two complementary sized bores 152 and 154. One section of the plunger 150 is formed as a diaphragm and has an inner face 156 exposed to air pressure in the delivery chamber 122, and the other section of the same plunger is formed as a piston and has an outer face 158 exposed to air pressure in the control chamber 126. However, the respective air pressures in the delivery chamber 122 and the control chamber 126 are equalized by a feedback passage 160 connecting the two chambers. A vent passage 162 vacates air from the bore 152 between the two faces of the plunger 150. Air vacated from the bore 152 can be exhausted separately to "atmosphere" as shown, or the vacated air can be combined with air in the exhaust passage 140 for vacating the air through exhaust port 132.

Air pressure in the delivery chamber is applied over substantially equal areas of the inner face 156 of the plunger and the valve head 146 of the exhaust valve generating equal but opposite separating forces. A rod 164 connects the plunger 150 to the valve head 146 for balancing the valve head 146 against air pressure in the delivery chamber 122. However, the same pressure is effective in the control chamber 126 and is applied against the outer face 158 of the plunger for opposing movement of the solenoid actuator 144 with a feedback force proportional to the pressure in the delivery chamber 122.

Nonetheless, the area over which the control chamber air pressure is applied to the outer face 158 of the plunger can be sized independently of the respective areas of the valve head 146 and the inner face 156 of the plunger over which the same pressure is applied. Thus, the magnitude of a feedback force to the solenoid actuator 144 can be reduced by reducing the size of the outer face 158 of the plunger. This allows both the intake valve 134 and the exhaust valve 138 to be increased in size independently of the size and power requirements of the solenoid actuator 144.

Figure 4:
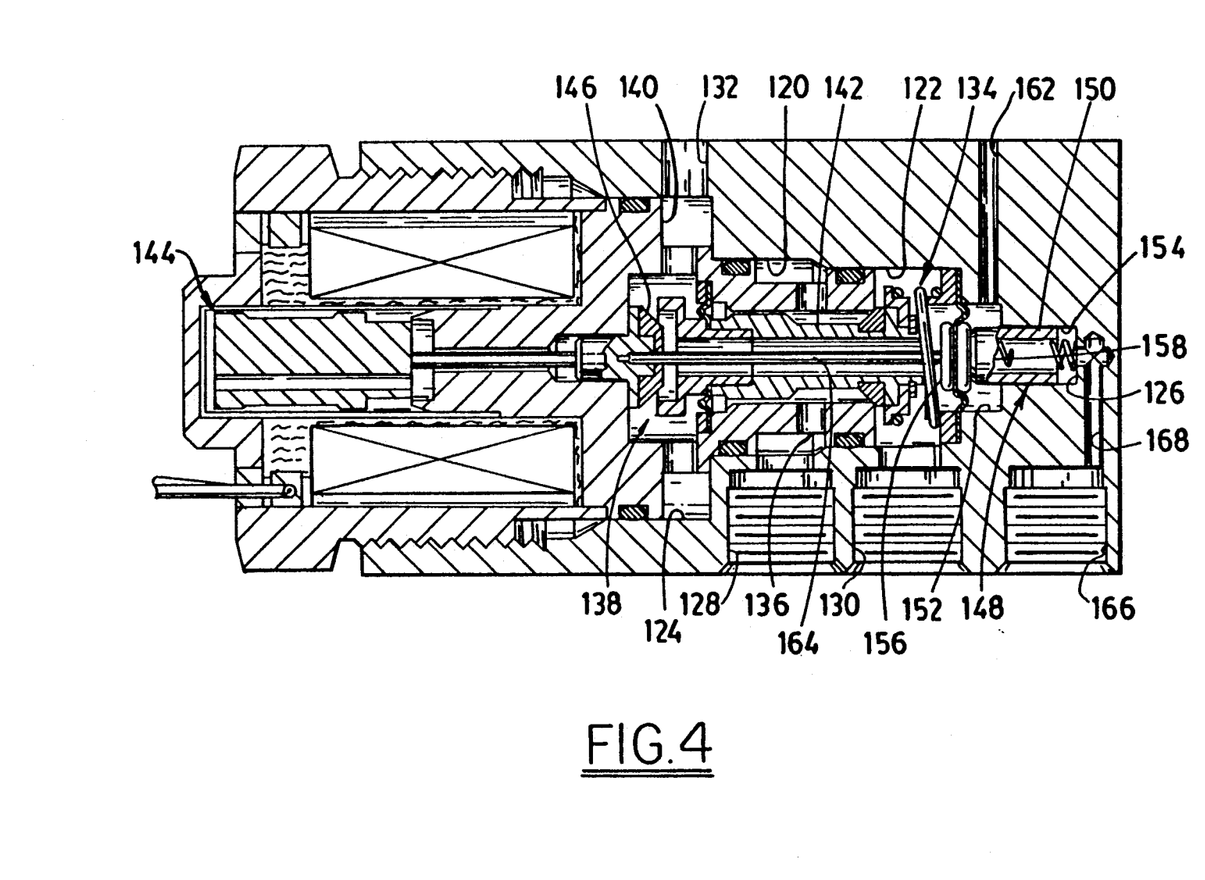
FIG. 4 is a cross-sectional view of a valve similar to the alternative valve modified both to reduce the magnitude of a feedback force opposing motion of a proportional actuator and to compensate for an external restriction to air flow between the valve and a closed volume load.

FIG. 4 discloses a valve similar to the valve of FIG. 3 but also incorporates features of the first two embodiments for enhancing operational stability. Elements in common with the immediately preceding embodiment are identified with like reference numerals.

However, in place of the feedback passage 160 shown in FIG. 3, the valve of FIG. 4 includes a sensing port 166 and a feedback passage 168 for connecting the control chamber 126 to the closed volume load. Thus, in addition to controlling the size of the feedback force with differential areas of the double-acting cylinder 148, differential pressures across the two areas of the double-acting cylinder are used to match the feedback force more closely to pressure changes in the closed volume load.

These relationships of differential areas and pressures can be expressed in equation form for a total feedback force "$F_d$" Opposing movement of the solenoid actuator 144 as follows:

$$F_d = P_i A_1 - P_i A_2 + P_o A_3$$

where: "$P_i$" is the air pressure in the delivery chamber 122, "$P_o$" is the air pressure in the control chamber 126, "$A_1$" is the area of the valve head 146 over which the pressure "$P_i$" is applied, "$A_2$" is the area of the inner face 156 of the plunger 150 over which the pressure "$P_i$" is also applied, and "$A_3$" is the area of the outer face 158 of the same plunger over which the pressure "$P_o$" is applied.

Preferably, the areas "$A_1$" and "$A_2$" are made equal so that the equation for the feedback force "$F_d$" can be simplified as follows:

$$F_d P_o A_3$$

The pressure "$P_o$" can be applied independently of the pressure fluctuations in the delivery chamber 122, and the area "$A_3$" can be selected independently of the size of the intake valve 134 and the exhaust valve 138. However, if the two pressures "$P_i$" and "$P_o$" are the same, then the areas "$A_1$" and "$A_3$" can be adjusted in size with respect to the area "$A_2$" to appropriately scale the feedback force "$F_d$" to the desired working pressure of the closed volume load.

Figure 5:
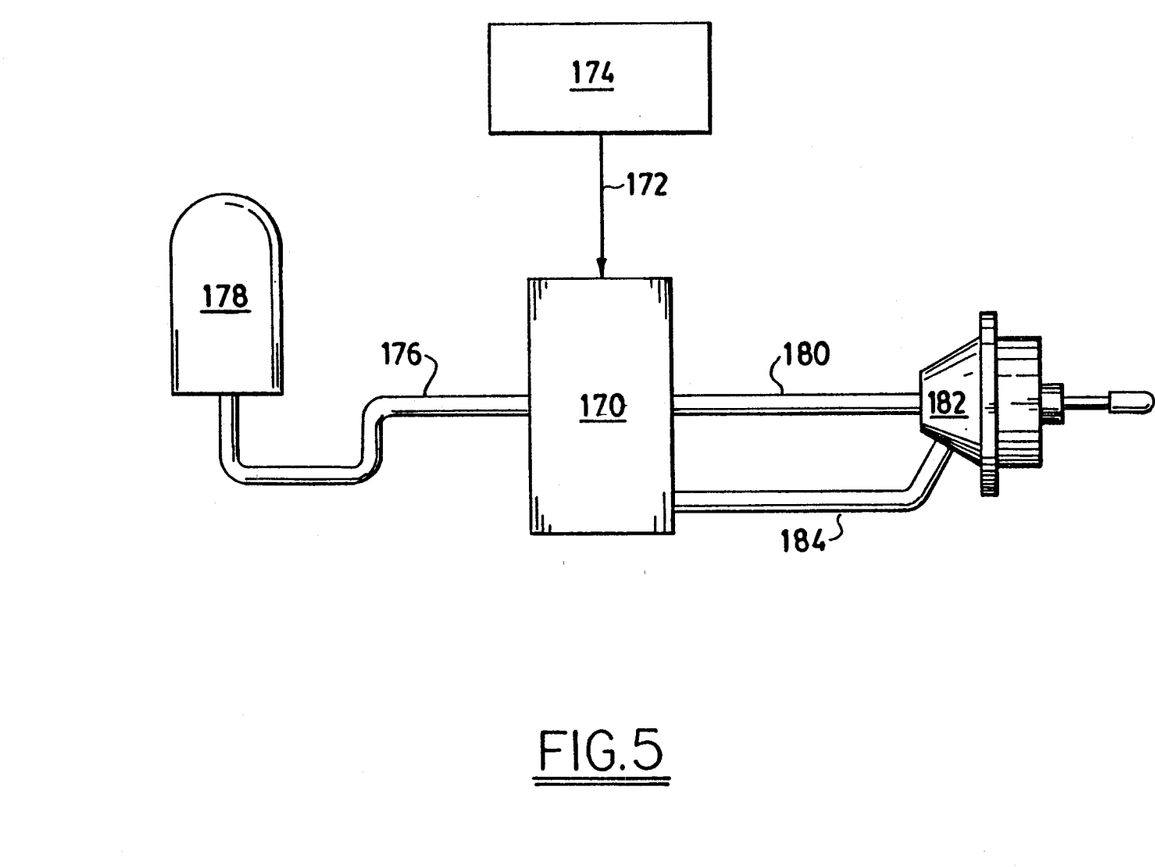
FIG. 5 is a diagram showing an example of my valve incorporated into an electronically controlled braking system.

FIG. 5 depicts my new proportional control valve as a component in an electronic braking system. The proportional control valve 170 receives an electronic control signal 172 from an electronic controller 174. A supply line 176 connects the valve 170 to a source of pressurized air 178 for conveying a flow of pressurized air to the valve. A delivery line 180 connects the valve 170 to a brake cylinder 182 for conveying the flow of pressurized air to the brake cylinder and for exhausting the flow of pressurized air from the brake cylinder.

A separate feedback line 184 also connects the proportional control valve 170 to the brake cylinder 182 for communicating working pressure of the brake cylinder to the valve. The communicated working pressure is used as feedback pressure to adjust operation of the valve to match the control signal 172 independently of the back pressure also communicated to the valve by the delivery line 180.

I claim:

1. A proportional control valve for controlling fluid pressure in a closed volume load comprising:
   a housing;
   a first passage within said housing connecting an inlet port to a working port for increasing fluid pressure in the closed volume load;
   a second passage within said housing connecting said working port to an exhaust port for decreasing fluid pressure in the closed volume load;

a directional valve for controlling fluid flow through said first and second passages;

a first actuator movable in a first direction by a control signal and movable in a second direction by fluid pressure from a first side of a restriction to fluid flow between a common portion of said first and second passages and the closed volume load;

a second actuator movable in said first direction by fluid pressure from the first side of the restriction and movable in said second direction by fluid pressure from a second side of the restriction;

said restriction being sized to provide a pressure difference between the first and second sides of the restriction so that the fluid pressure at the second side of the restriction closely matches the fluid pressure of the closed volume load and the fluid pressure at the first side of the restriction fluctuates with respect to the fluid pressure of the closed volume load accompanying operation of said directional control valve; and said first and second actuators being operatively associated with each other for regulating the fluid pressure at the second side of the restriction proportional to the control signal applied to the first actuator independently of the relative fluctuations of fluid pressure at the first side of the restriction.

2. The valve of claim 1 in which said directional valve includes a valve face operatively associated with said first actuator and having a first area over which the fluid pressure from the first side of the restriction is applied.

3. The valve of claim 2 in which said second actuator includes a first face having a second area over which the fluid pressure from the first side of the restriction is applied and a second face having a third area over which the fluid pressure from the second side of the restriction is applied.

4. The valve of claim 3 in which said first and second areas are substantially equal.

5. The valve of claim 4 in which said second actuator is operatively associated with said first actuator for opposing movement of said first actuator in said first direction.

6. The valve of claim 3 in which said third area is smaller than said first and second areas.

7. The valve of claim 6 in which said second actuator is operatively associated with said first actuator for aiding movement of said first actuator in said first direction.

8. The valve of claim 1 in which said first actuator is operatively associated with said directional valve so that movement of said first actuator in said first direction opens said first passage and closes said second passage and movement of said first actuator in said second direction closes said first passage and opens said second passage.

9. The valve of claim 8 in which said second actuator is a double-acting cylinder having a plunger that includes first and second faces over which pressure is applied from opposite sides of the restriction.

10. The valve of claim 9 in which said directional valve includes a valve face carried by said first actuator.

11. The valve of claim 10 in which a rod carried by said plunger abuts said valve face.

12. The valve of claim 11 in which said rod is mechanically connected to said valve face so that said plunger and said valve face move together as a single body in both of said first and second directions.

13. The valve of claim 12 in which said plunger has two different diameters for forming said first and second faces with different size areas.

14. The valve of claim 1 further comprising a third passage within said housing for connecting said second actuator to the second side of the restriction.

15. The valve of claim 14 in which said third passage connects said second actuator to a sensing port.

16. A fluid pressure control system for improving stability of proportional control valves comprising:

a first fluid conducting path for connecting a source of fluid under pressure to a closed volume load;

a first valve for controlling fluid flow along said first fluid conducting path;

a second fluid conducting path for connecting the closed volume load to an exhaust;

a second valve for controlling fluid flow along said second fluid conducting path;

an actuator movable in response to a control signal for: (a) opening said first valve and closing said second valve to increase fluid pressure at the closed volume load and (b) closing said first valve and opening said second valve to decrease fluid pressure at the closed volume load;

a restriction to fluid flow between one of said first and second valves and the closed volume load;

said restriction being sized to provide a pressure difference across first and second sides of the restriction so that the fluid pressure on the second side of the restriction closely matches the fluid pressure of the closed volume load and the fluid pressure on the first side of the restriction fluctuates with respect to the fluid pressure of the closed volume load accompanying operation of one of said first and second valves; and a device for converting fluid power into mechanical force and motion having a movable element exposed to the pressure difference across said restriction for contributing to a feedback force opposing said movement of the actuator proportional to the fluid pressure on the second side of said restriction independently of the pressure fluctuations on the first side of said restriction.

17. The system of claim 16 in which movement of said actuator in response to the control signal is opposed by a feedback force "$F_d$" in accordance with the following relationship:

$$F_d = P_i A_1 - P_i A_2 + P_o A_3$$

where:

"$P_i$" is a pressure on the first side of said restriction between one of said first and second valves and said restriction, "$P_o$" is a pressure on the second side of said restriction between said restriction and the closed volume load, "$A_1$" is an area of one of said first and second valves over which pressure "$P_i$" is effective for opposing movement of said actuator, "$A_2$" is an area on one side of said movable element over which pressure "$P_i$" is effective for assisting movement of the actuator, and "$A_3$" is an area on another side of said movable element over which pressure "$P_o$" is effective for opposing movement of the actuator.

18. The system of claim 17 in which the feedback force "$F_d$" opposes movement of said actuator in a direction that opens said first valve and closes said second valve.

19. The system of claim 18 in which the area "$A_1$" is equal to an area of said second valve over which pressure "$P_i$" is effective for opposing movement of said actuator.

20. The system of claim 17 in which the areas "$A_1$" and "$A_2$" are substantially equal so that the magnitude of the feedback force "$F_d$" is substantially equal to the product of the pressure "$P_o$" and the area "$A_3$".

21. The system of claim 20 in which area "$A_3$" is less than the respective areas "$A_1$" and "$A_2$" so that the feedback force "$F_d$" is less than the product of the pressure "$P_i$" and the area "$A_1$".

22. The system of claim 16 in which said movable element has first and second faces that are respectively exposed to the pressure difference across said restriction.

23. The system of claim 22 in which a common portion of said first and second fluid conducting paths conducts fluid to said first face of the movable element and a third fluid conducting path conducts fluid to said second face of the movable element.

24. The system of claim 23 in which said common portion of the first and second fluid conducting paths communicates pressure from one of two sides of said restriction to said first face of the movable element.

25. The system of claim 24 in which said third fluid conducting path communicates pressure from the other side of said restriction to said second face of the movable element.

26. The system of claim 25 in which said restriction is located within said common portion of the first and second fluid conducting paths.

27. The system of claim 26 in which said third fluid conducting path communicates pressure from the closed volume load to said second face of the movable element.

28. The system of claim 16 in which said actuator is movable together with said movable element in a first direction for opening said first valve and closing said second valve.

29. The system of claim 28 in which said second valve includes an area over which fluid pressure acts to oppose movement of said actuator in said first direction.

30. The system of claim 29 in which said movable element includes a first face that has an area over which fluid pressure operates to assist movement of said movable element in said first direction and a second face that has an area over which fluid pressure operates to oppose movement of said movable element and said actuator in said first direction.

31. The system of claim 30 in which said actuator is connected to said movable element for movement together with said movable element in a second direction for closing said first valve and opening said second valve.

* * * * *